(12) United States Patent
Schoenmakers et al.

(10) Patent No.: US 12,522,406 B2
(45) Date of Patent: Jan. 13, 2026

(54) CLOSURE WITH A LOCKING RIM HAVING A SEALING RIB

(71) Applicant: Weener Plastics Group B.V., Ede (NL)

(72) Inventors: Antonetta Johanna Maria Schoenmakers, Udenhout (NL); Henricus Johannes Cornelius Nuijen, Linden (NL); Dennis Antonius Wilhelmus Maria van Meurs, 's-Hertogenbosch (NL)

(73) Assignee: Weener Plastics Group B.V., Ede (NL)

( * ) Notice: Subject to any disclaimer, the term of this patent is extended or adjusted under 35 U.S.C. 154(b) by 0 days.

(21) Appl. No.: 18/559,621

(22) PCT Filed: May 20, 2022

(86) PCT No.: PCT/EP2022/063763
§ 371 (c)(1),
(2) Date: Nov. 8, 2023

(87) PCT Pub. No.: WO2022/243530
PCT Pub. Date: Nov. 24, 2022

(65) Prior Publication Data
US 2024/0228128 A1    Jul. 11, 2024

(30) Foreign Application Priority Data
May 21, 2021   (NL) ...................... 2028274

(51) Int. Cl.
*B65D 43/16*   (2006.01)
*B29D 99/00*   (2010.01)

(52) U.S. Cl.
CPC ....... *B65D 43/169* (2013.01); *B29D 99/0096* (2013.01); *B65D 2251/1058* (2013.01)

(58) Field of Classification Search
CPC .......... B65D 43/169; B65D 2251/1058; B65D 2251/20; B65D 2255/20;
(Continued)

(56) References Cited

U.S. PATENT DOCUMENTS 5,090,788 A * 2/1992 Ingram ................... B29C 57/00
215/252
2005/0023183 A1* 2/2005 Banik ................ B65D 77/0486
206/581
(Continued)

FOREIGN PATENT DOCUMENTS

EP    3 326 452 A1    5/2018
EP    4 032 396 A1    7/2022
(Continued)

OTHER PUBLICATIONS

European Patent Application No. 24156854.2, European Search Report, dated Jun. 21, 2024, 10 pages.

*Primary Examiner* — Shawn M Braden
(74) *Attorney, Agent, or Firm* — Hoffmann & Baron, LLP

(57) ABSTRACT

A closure includes an annular base to be fixed to an upper rim of a container and a lid moveable relative to the annular base between a closed position and an open position. The annular base includes a peripheral skirt with an integral non-removable end portion adapted to be arranged over the upper rim of the container and a peripheral locking rim integrally formed on the end portion of the peripheral skirt. A proximal end of the peripheral locking rim is hingedly connected to the peripheral skirt, allowing the peripheral locking rim to be folded inwardly towards an inner surface of the end portion of the peripheral skirt and allowing the distal end to move beyond and engage under the peripheral ledge of the container to lock the annular base to the upper rim of the container. The locking rim includes a surface radially inwardly and circumferentially extending sealing rib.

16 Claims, 2 Drawing Sheets

(58) Field of Classification Search
CPC ............. B65D 2543/00435; B65D 2543/0099; B65D 47/0804; B29D 99/0096
See application file for complete search history.

(56) References Cited

U.S. PATENT DOCUMENTS

| | | |
|---|---|---|
| 2006/0191933 A1 | 8/2006 | Hicks et al. |
| 2006/0218862 A1 | 10/2006 | Dyas |
| 2022/0106083 A1* | 4/2022 | Schoenmakers ..... B65D 43/164 |

FOREIGN PATENT DOCUMENTS

| | | |
|---|---|---|
| WO | 96/19388 A1 | 6/1996 |
| WO | 2015/191556 A2 | 12/2015 |
| WO | 2016/022744 A1 | 2/2016 |
| WO | 2020/096629 A1 | 5/2020 |
| WO | 2020/153836 A1 | 7/2020 |

* cited by examiner

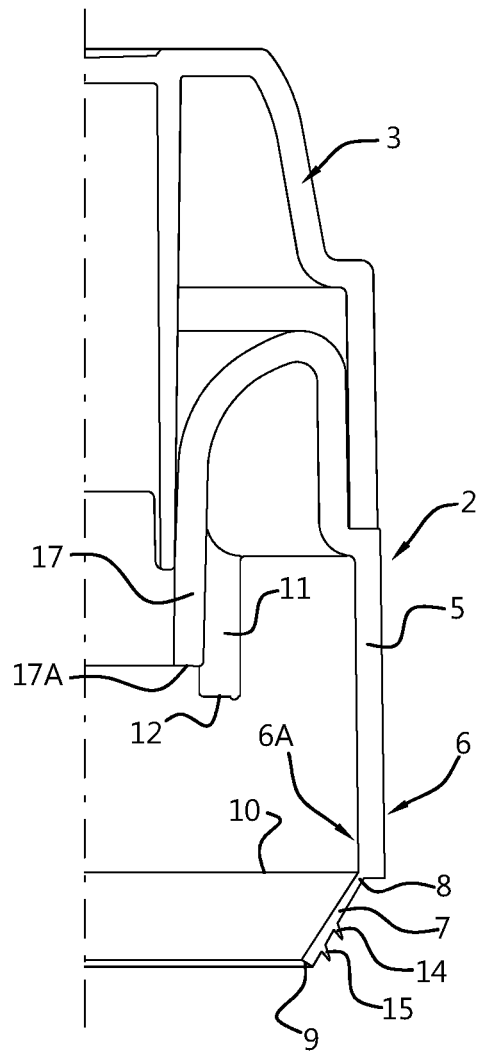
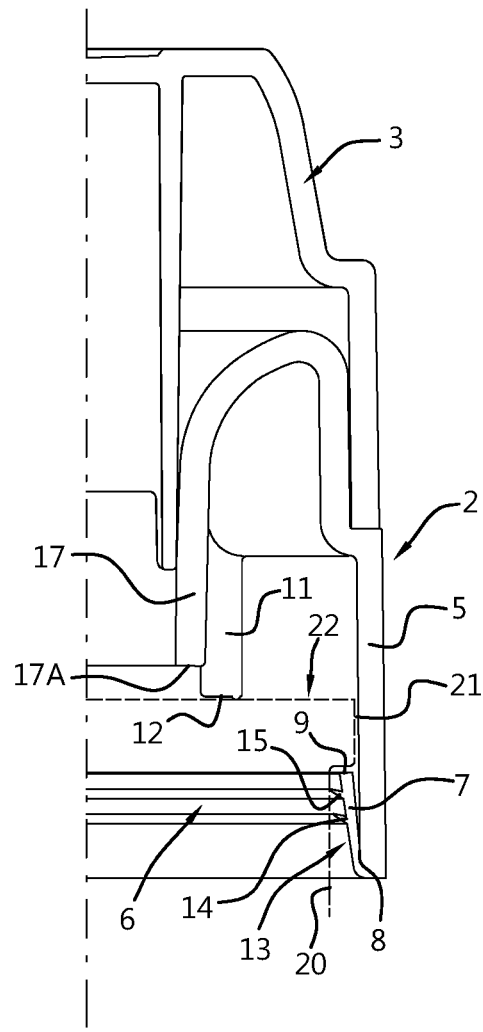

CLOSURE WITH A LOCKING RIM HAVING A SEALING RIB

CROSS-REFERENCE TO RELATED APPLICATIONS

This application is the National Stage of International Application No. PCT/EP2022/063763, filed May 20, 2022, which claims the benefit of Netherlands Application No. 2028274, filed May 21, 2021, the contents of which is incorporated by reference herein.

FIELD OF THE INVENTION

The present invention relates to a closure for a container, said container having an open top side defined by an upper rim comprising an outwardly extending peripheral ledge surrounding said open top side, where the closure comprises an annular base to be fixed to the upper rim of the container and defines an access opening to the container, and the closure further comprises a lid moveable relative to the annular base.

BACKGROUND OF THE INVENTION

WO 96/19388 discloses a closure made of a plastics material and including a circumferential skirt having a lower portion where a locking member of a conical form is formed. The neck of the container includes an outwardly directed ledge. When the closure is assembled onto the neck of the container, the locking member strikes the ledge of the container and the locking rim is rotated about a hinge into an upwardly directed position. Upon further axial movement of the closure, the locking member rides over the ledge until it enters an undercut such that the free end thereof seats under the ledge. When the locking member is seated under the ledge the closure is effectively locked in place, whereby the skirt cannot be separated from the neck of the container without breaking or damaging the locking means or the container.

A similar closure as the one disclosed in WO 96/19388, including the same locking mechanism is disclosed in WO 2016/022744.

The invention has for an object to provide a better sealing between the closure on a container.

This object is achieved by a closure according to the invention.

SUMMARY OF THE INVENTION

A closure for a container, said container having an open top side defined by an upper rim comprising an outwardly extending peripheral ledge surrounding said open top side. The closure comprises an annular base to be fixed to the upper rim of the container and defines an access opening to the container, and the closure further comprises a lid moveable relative to the annular base between a closed position, in which the lid covers the access opening, and an open position, in which the access opening is unblocked by the lid. The annular base comprises a peripheral skirt which has an integral non-removable end portion adapted to be arranged over the upper rim of the container, and furthermore comprises a peripheral locking rim integrally formed on said end portion of the peripheral skirt, said peripheral locking rim having a proximal end and a distal end. The proximal end of the peripheral locking rim is hingedly connected to the peripheral skirt, allowing the peripheral locking rim to be moved to a folded state, in which the peripheral locking rim is folded inwardly towards an inner surface of the end portion of the peripheral skirt, such that, when the locking rim is in the folded state, the distal end thereof can move beyond and engage under the peripheral ledge of the container to lock the annular base to the upper rim of the container. The locking rim has a surface facing radially inwardly in the folded state, wherein at least one circumferentially extending sealing rib is formed on said circumferential surface.

The sealing provided by the at least one sealing rib facilitates a better preservation of the contents of the container. The exact dimensions of the outer surface of the container relative to the dimensions of the annular base of the closure may vary, for example due to manufacturing tolerances. The at least one sealing rib allows that the locking rim can always engage the outer peripheral surface of the container under the ledge. This provides a seal between the circumferential wall of the container and the locking rim, even if the locking rim is somewhat deformed.

Furthermore, the sealing rib also allows to eliminate play in radial direction between the locking rim and the outer surface of the container caused by manufacturing tolerances. This benefits the sealing function, but also gives the connection between the closure and the container a sturdy feel and touch.

In a possible embodiment the sealing rib has a triangular cross section. This shape of the sealing rib facilitates the adaptation of the ribs to the actual distance in radial direction between the locking rim and the outer surface of the container, which may vary due to manufacturing tolerances.

In a possible embodiment the sealing rib is spaced apart from the distal end of the peripheral locking rim. This has the effect that distal end can engage the outer surface of the container and provide a first sealing and the sealing rib provides a further sealing.

In a preferred embodiment the locking rim has two spaced apart parallel sealing ribs. The two ribs in practise improve the sealing function.

In a possible embodiment the sealing rib(s) is/are located closer to the distal end than to the proximal end of the locking rim. By this location at least the sealing function can be better warranted.

The invention will be further explained in the following description with reference to the drawings.

BRIEF DESCRIPTION OF THE DRAWINGS

FIG. 3 shows a cross-sectional view of the closure of FIG. 1 with a foldable rim in an unfolded state, FIG. 5 shows a cross-sectional view of the closure of FIG. 1 with a foldable rim in a folded state.

DETAILED DESCRIPTION

Figure 1:
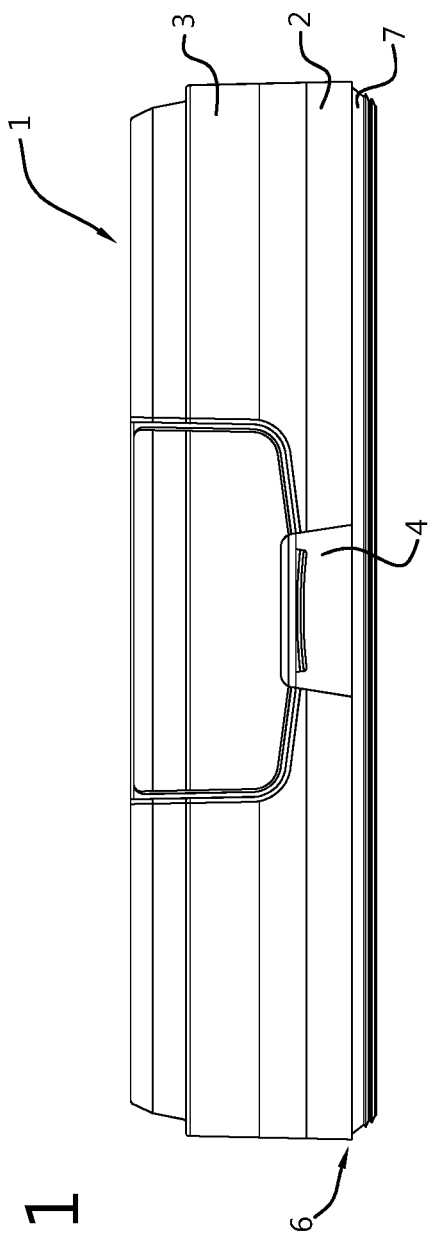
FIG. 1 shows a front elevational view of an embodiment of a closure according to the invention.

In FIG. 1 is shown a possible embodiment of a closure 1 for a container containing a powdered or granular product, such as for instance baby formula. The closure 1 comprises an annular base 2 and a lid 3 which can be opened such that the inside of the container is made accessible. The annular base 2 defines an access opening to access the inside of the container. The closure 1 may be made by an injection moulding process from a suitable plastics material, e.g. PP or PE.

The embodiment of the closure 2 shown in FIG. 1 may comprise a hinge (not shown) such that the lid 3 can be swivelled from a closed position, shown in FIG. 1 to an open position. The hinge may be a living hinge which is integrally formed with the annular base 2 and the lid 3. Another option is to form the lid and the annular base separately and join them by hinging means. However, also an embodiment is possible wherein the lid is not coupled to the annular base by a hinge and can be entirely removed from the annular base. The way the lid and the annular base are arranged with respect to each other is not essential for the invention.

On a front side, diametrically opposite from the side where the hinge is located, a locking tab 4 is formed, to lock the lid in closed position.

The annular base 2 is adapted to be arranged over the open top of the container. The container comprises an upper rim, which includes a peripheral ledge which extends radially outward with respect to the outer surface of the container wall.

The annular base 2 comprises a peripheral skirt 5. As can be seen in FIG. the peripheral skirt 5 has a lower end portion 6 that can be arranged over the upper rim of the container. The end portion 6 of the peripheral skirt 5 includes a locking rim 7 extending circumferentially from a lower end of the peripheral skirt 5 as can be seen best in FIGS. 2 and 3. The locking rim 7 is integrally formed with the skirt 5.

The locking rim 7 is connected to the peripheral skirt 5 at a proximal end 8 of the locking rim 7. The locking rim 7 also has a distal end 9, which is remote from the proximal end 8 and is a free end (see FIG. 3).

Figure 4:
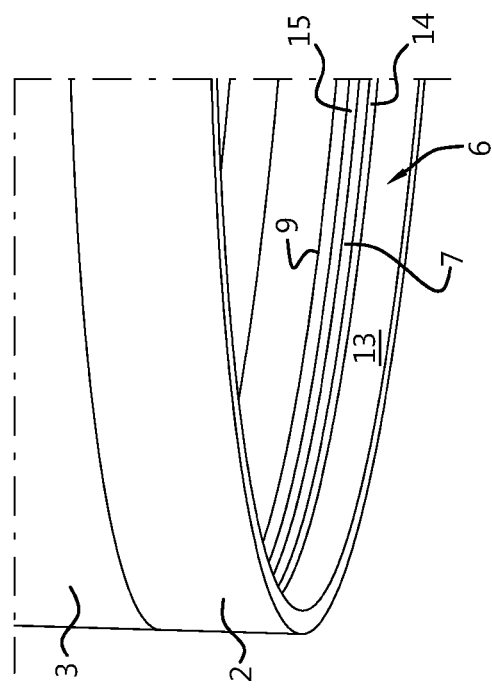
FIG. 4 shows in a view in perspective a detail of the closure of FIG. 1 showing a foldable rim in a folded state.
Figure 2:
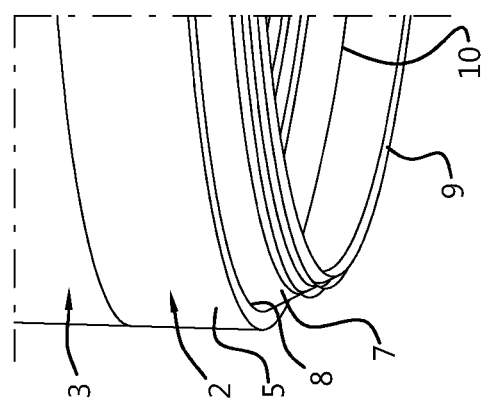
FIG. 2 shows in a view in perspective a detail of the closure of FIG. 1 showing a foldable rim in an unfolded state.

The proximal end 8 of the peripheral locking rim 7 is hingedly connected to the peripheral skirt 5. The proximal end 8 includes a circumferential hinge region 10 as can be seen in FIG. 6. The hinge region 10 allows that the peripheral locking rim 7 can be moved from an initial state, which is shown in FIGS. 1, 2 and 3, towards a folded state, which is shown in FIGS. 4 and 5.

In the initial state (cf. FIGS. 2 and 3) the locking rim 7 extends away from the lower end of the skirt 5 and thus the distal end 9 of the locking rim 7 is remote from the end portion 6 of the peripheral skirt 5. In the folded state (cf. FIGS. 4 and 5) the peripheral locking rim 7 is folded inwardly towards the inner surface 6A of the end portion 6 of the peripheral skirt 5.

Preferably, the locking rim 7 is brought to the folded state by a device before the closure 1 and the container are assembled. In particular, the locking rim 7 may be brought to the folded state just after the closure 1 is removed from the mould it is formed in. The closure 1 thus has the locking rim 7 in the folded state, shown in FIGS. 4 and 5, when the closure 1 and the container are assembled together. The manufacturer of the closures 1 can thus supply the closures 1 in the state illustrated in FIGS. 4 and 5 to the filler company, which fills the container and assembles the closure 1 and the container. During assembly the locking rim 7 slides with an outer surface of the ledge of the container and the locking rim 7 is pushed outwardly towards the inner surface 6A of the skirt 5 to be able to move beyond the ledge.

The exact dimensions of the upper rim of the container relative to the dimensions of the annular base 2 of the closure 1, might vary, for example due to manufacturing tolerances. Consequently there might be a gap between the infolded locking rim 7 and the inner surface when the locking rim 7 passes the ledge.

The distal end 9 of the locking rim 7 resiliently hinges back to engage under the peripheral ledge of the container when the distal end 9 has passed beyond the peripheral ledge. This state is shown in FIG. 5, in which the container and the ledge are drawn is dashed lines. The container is indicated by reference numeral 20 and the ledge by 21. In this state the locking rim 7 prevents that the annular base 2 can move upwardly relative to the upper rim 22 of the container 20. The annular base 1 is thus locked to the upper rim 22 of the container 20.

The annular base furthermore comprises an inner skirt 17 which is coaxial with the peripheral skirt 5 and is integrally connected with the peripheral skirt 5 at an upper side. The inner skirt 17 has a lower end 17A which in the fixed state on the container is spaced above the upper rim of the container 20. In the fixed state on the container, the inner skirt 17 is located radially inward from the upper rim of the container 20.

Axially extending ribs 11 are formed on the inner side of the peripheral skirt 5. The axial ribs 11 have an end 12 near the end portion 6 of the peripheral skirt 5. The end 12 of the axial ribs 11 form a stop for the upper side of the upper rim 22 of the container as can be seen in FIG. 5. The axial distance between the end 12 of the axial ribs 11 and the distal end 9 of the peripheral locking rim 7 in the inwardly folded state is larger than the height of the peripheral ledge 21 of the container 20 as is visible in FIG. 5. In other words, when the axial ribs 11 rest with their ends 12 on the upper rim 22 of the container, there is a small spacing (max. 1 mm) between the distal end 9 of the locking rim 7 and the lower side of the ledge 21, which is visible in FIG. 5. This measure allows that even though variations in the height of the ledge 21 can occur in practise, for example due to manufacturing tolerances, the annular base 2 always fits on the upper rim of the container 20, albeit with a little play.

The peripheral locking rim 7 has a surface 13 facing radially inwardly in the folded state as shown in FIGS. 4-6. On said circumferential surface 13 a pair of spaced apart circumferentially extending sealing ribs 14 and 15 are formed, which are parallel to each other. The sealing rib 15 is spaced apart from the distal end 9 of the peripheral locking rim 7. The pair of sealing ribs 14, 15 is located closer to the distal end 9 than to the proximal end 8 of the locking rim 7.

The sealing ribs 14, 15 have a triangular cross section, which is best seen in FIG. 6. The triangle has a side 14A, 15A that in the folded state faces downwardly. This side 14A, 15 A is under an angle α with the surface 13 wherein α<90°, preferably 80°<α≥40°, in the figure about 45°.

The sealing ribs 14, 15 allow that the locking rim can always engage the outer peripheral surface of the container under the ledge. This provides a seal between the circumferential wall of the container 20 and the locking rim 7, but also allows to eliminate play in radial direction between the locking rim 7 and the outer surface of the container 20, even if the exact dimensions of the outer surface of the container relative to the dimensions of the annular base 2 of the closure 1, might vary, for example due to manufacturing tolerances. This gives the connection between the closure 1 and the container 20 a sturdy feel and touch.

The invention claimed is:

1. A closure for a container, said container having an open top side defined by an upper rim comprising an outwardly extending peripheral ledge surrounding said open top side, the closure comprising an annular base to be fixed to the upper rim of the container and defining an access opening to the container, and the closure further comprising a lid moveable relative to the annular base between a closed position, in which the lid covers the access opening, and an open position, in which the access opening is unblocked by the lid, the annular base comprising a peripheral skirt which has an integral non-removable end portion adapted to be arranged over the upper rim of the container, and furthermore comprising a peripheral locking rim integrally formed on said end portion of the peripheral skirt, said peripheral locking rim having a proximal end and a distal end, said proximal end of the peripheral locking rim being hingedly connected to the peripheral skirt, allowing the peripheral locking rim to be moved to a folded state, in which the peripheral locking rim is folded inwardly towards an inner surface of the end portion of the peripheral skirt, such that, when the locking rim is in the folded state, the distal end thereof can move beyond and engage under the peripheral ledge of the container to lock the annular base to the upper rim of the container, wherein the locking rim has a surface facing radially inwardly in the folded state, wherein two spaced apart parallel circumferentially extending sealing ribs are formed on said circumferential surface.

2. The closure according to claim 1, wherein the sealing ribs have a triangular cross section, wherein at least the side of the triangle that in the folded state faces downwardly is under an angle $\alpha<90°$.

3. The closure according to claim 1, wherein the sealing ribs are spaced apart from the distal end of the peripheral locking rim.

4. The closure according to claim 1, wherein the sealing ribs are located closer to the distal end than to the proximal end of the locking rim.

5. The closure according to claim 1, wherein the annular base furthermore comprises an inner skirt which is coaxial with the peripheral skirt and is integrally connected with the peripheral skirt at an upper side.

6. The closure according to claim 5, wherein the inner skirt has a lower end which in the fixed state on the container is spaced above the upper rim of the container.

7. The closure according to claim 5, wherein the inner skirt in the fixed state on the container is located radially inward from the upper rim of the container.

8. The closure according to claim 1, wherein the peripheral skirt has axially extending ribs on the inner side, wherein the axial ribs have an end near the end portion of the peripheral skirt, wherein said end of the axial ribs form a stop for the upper rim of the container.

9. The closure according to claim 8, wherein the axial distance between the end of the axial ribs and the distal end of the peripheral locking rim in the inwardly folded state is larger than the height of the peripheral ledge of the container.

10. The closure according to claim 1, wherein the annular base and the lid are connected by a hinge.

11. The closure according to claim 1, wherein the annular base and the lid are formed in one piece.

12. The closure according to claim 1, wherein the annular base and the lid are separately formed parts which are assembled to form the closure.

13. The closure according to claim 1, wherein the closure is made of a plastics material.

14. The closure according to claim 2, wherein the angle $\alpha$ is within the range $80°\leq\alpha\leq40°$.

15. A closure for a container, said container having an open top side defined by an upper rim comprising an outwardly extending peripheral ledge surrounding said open top side, the closure comprising an annular base to be fixed to the upper rim of the container and defining an access opening to the container, and the closure further comprising a lid moveable relative to the annular base between a closed position, in which the lid covers the access opening, and an open position, in which the access opening is unblocked by the lid, the annular base comprising a peripheral skirt which has an integral non-removable end portion adapted to be arranged over the upper rim of the container, and furthermore comprising a peripheral locking rim integrally formed on said end portion of the peripheral skirt, said peripheral locking rim having a proximal end and a distal end, said proximal end of the peripheral locking rim being hingedly connected to the peripheral skirt, allowing the peripheral locking rim to be moved to a folded state, in which the peripheral locking rim is folded inwardly towards an inner surface of the end portion of the peripheral skirt, such that, when the locking rim is in the folded state, the distal end thereof can move beyond and engage under the peripheral ledge of the container to lock the annular base to the upper rim of the container, wherein the locking rim has a surface facing radially inwardly in the folded state, wherein at least one circumferentially extending sealing rib is formed on said circumferential surface, wherein the at least one sealing rib is located closer to the distal end than to the proximal end of the locking rim.

16. A closure for a container, said container having an open top side defined by an upper rim comprising an outwardly extending peripheral ledge surrounding said open top side, the closure comprising an annular base to be fixed to the upper rim of the container and defining an access opening to the container, and the closure further comprising a lid moveable relative to the annular base between a closed position, in which the lid covers the access opening, and an open position, in which the access opening is unblocked by the lid, the annular base comprising a peripheral skirt which has an integral non-removable end portion adapted to be arranged over the upper rim of the container, and furthermore comprising a peripheral locking rim integrally formed on said end portion of the peripheral skirt, said peripheral locking rim having a proximal end and a distal end, said proximal end of the peripheral locking rim being hingedly connected to the peripheral skirt, allowing the peripheral locking rim to be moved to a folded state, in which the peripheral locking rim is folded inwardly towards an inner surface of the end portion of the peripheral skirt, such that, when the locking rim is in the folded state, the distal end thereof can move beyond and engage under the peripheral ledge of the container to lock the annular base to the upper rim of the container, wherein the locking rim has a surface facing radially inwardly in the folded state, wherein at least one circumferentially extending sealing rib is formed on said circumferential surface, and wherein the peripheral skirt has axially extending ribs on the inner side, wherein the axial ribs have an end near the end portion of the peripheral skirt, wherein said end of the axial ribs form a stop for the upper rim of the container.

\* \* \* \* \*